United States Patent [19]
Feigel et al.

[11] Patent Number: 5,725,287
[45] Date of Patent: Mar. 10, 1998

[54] HYDRAULIC MOTOR VEHICLE BRAKE INSTALLATION

[75] Inventors: Hans-Jorg Feigel, Rosbach; Andreas Klein, Bad Homburg; Ulrich Neumann, Rossdorf; Lothar Schiel, Hofheim, all of Germany

[73] Assignee: ITT Automotive Europe GmbH, Germany

[21] Appl. No.: 624,397

[22] PCT Filed: Jul. 18, 1995

[86] PCT No.: PCT/EP95/02809

§ 371 Date: Jun. 18, 1996

§ 102(e) Date: Jun. 18, 1996

[87] PCT Pub. No.: WO96/04159

PCT Pub. Date: Feb. 15, 1996

[30] Foreign Application Priority Data

Aug. 5, 1994 [DE] Germany .......... 44 27 799.7

[51] Int. Cl.⁶ .................................................. B60T 8/40
[52] U.S. Cl. ............ 303/116.4; 417/269; 417/415; 417/521
[58] Field of Search .................... 303/116.4, 116.1; 417/269, 271, 415, 521

[56] References Cited

U.S. PATENT DOCUMENTS

| | | |
|---|---|---|
| 3,180,271 | 4/1965 | Hartmann . |
| 4,496,288 | 1/1985 | Nakamura et al. . |

FOREIGN PATENT DOCUMENTS

| | | |
|---|---|---|
| 0202816 | 11/1986 | European Pat. Off. . |
| 0601751 | 6/1994 | European Pat. Off. . |
| 2588322 | 10/1987 | France . |
| 1203611 | of 0000 | Germany . |
| 3538839 | 5/1988 | Germany . |
| 3718311 | 12/1988 | Germany . |
| 3906141 | 9/1989 | Germany . |
| 4000837 | 7/1991 | Germany . |
| 4041800 | 6/1992 | Germany . |
| 743088 | 1/1956 | United Kingdom . |

*Primary Examiner*—Peter M. Poon
*Attorney, Agent, or Firm*—Thomas N. Twomey; J. Gordon Lewis

[57] ABSTRACT

A hydraulic motor vehicle brake installation, the braking pressure modulation of which occurs over adjustable wing cell pumps, as space-saving solution it is proposed to have all the required wing cell pumps driven over a common shaft by a turning-rate stabilized electric motor. An individual control of each individual wing cell pump occurs through the drive of a lift ring each by one proportional magnet per wing cell pump.

7 Claims, 3 Drawing Sheets

HYDRAULIC MOTOR VEHICLE BRAKE INSTALLATION

TECHNICAL FIELD

The present invention relates to hydraulic brakes and more particularly relates to hydraulic brake systems which use a motorized pump to control various modes of vehicle braking.

BACKGROUND OF THE INVENTION

Such brake installations are generally known from DE 39 06 141 A1. In this known hydraulic brake installation with antilock regulating arrangement there is provided a controllable hydraulic pump connected with the wheel braking cylinder, which pump in inactive antilocking regulation takes over the function of braking force reinforcement and in active antilocking regulation takes over the function of a pressure modulator. The controllable hydraulic pump engageable on a brake pedal actuation is a wing cell pump controllable not only with respect to its conveying performance but also with respect to its conveying direction. The pump is interposed in each case into the brake line leading from the main cylinder to the wheel brakes, its conveying direction being adjustable by means of a hydraulically adjustable lift ring. During normal brake actuation the pump directs hydraulic pressure toward the wheelbrake. During antilocking regulation the pump directs hydraulic pressure toward the main cylinder. Since in a locking-protected brake installation not all the wheel brakes can be regulated in common, but individually or in pairs according to the type of the brake installation, several such pump arrangement are required.

The problem overcome by the present invention is the problem of creating a brake installation of the above-described type with an especially economical and space-saving arrangement of several such adjustable wing cell pumps.

This problem is solved by using wing-cell pumps and adjusting their conveying direction and also their conveying performance (power) at a constant turning rate by means of a common motor. The conveyance of each individual wing-cell pump can be individually adjusted without influencing the output power of the other pump.

So that the conveying performance of each individual wing-cell pump will be independent from the other wing-cell pump, the turning rate of the electric motor stabilized.

By using modular construction techniques, this arrangement can be used also in different brake installations with different number of regulated circuits.

Since at least one wing-cell pump is always driven by the motor, this first wing-cell pump can also be rigidly fastened to the motor.

A stageless adjustment of the individual lift rings improves the regulating quality. There, proportional magnets are preferred and present an especially simple solution.

By an elastic pre-tensioning of the lift rings, it is not necessary that an electromagnetic setting force be constantly exerted on the lift ring, in which expediently the conveying direction established by the elastic pre-tensioning points in the direction toward the wheel brakes, since this conveying direction is used in the more frequent cases of the pump actuation.

DETAILED DESCRIPTION OF THE PREFERRED EMBODIMENT

Figure 1:
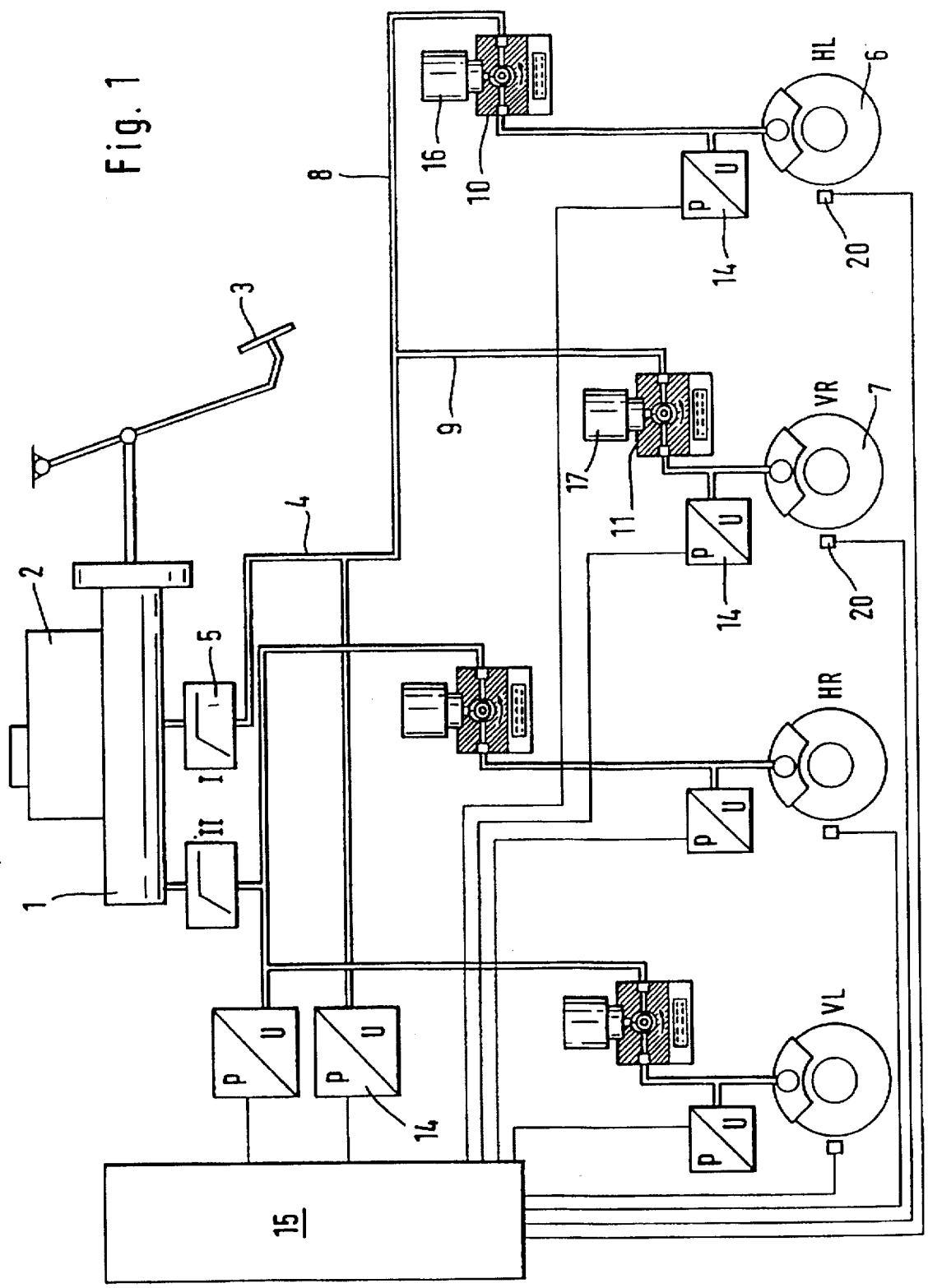
FIG. 1 shows a pneumatically indicated hydraulic switching plan of a brake installation according to the invention.

In FIG. 1, only the hydraulic circuit is indicated, not the spatial arrangement (i.e. the position of the individual wing-cell pumps does not correspond to the actual arrangement).

In the brake installation represented in FIG. 1, a two-circuit brake installation with diagonal braking circuit sub-division is depicted. Since brake circuits I and II are identically constructed, the following description of brake circuit I holds correspondingly also for brake circuit II.

With brake pedal 3 unactuated, the main cylinder 1 is connected with the pressure medium container 2. Pressure chambers are connected to brake circuits I and II. Into the brake line 4 there is inserted in each case a pressure limiting valve 5. Toward the wheel brakes 6 and 7 the brake line 4 is divided into two brake branch lines 8 and 9 one each to a wheel brake 6, respectively 7. In each brake branch line 8 and 9 there is arranged a wing cell pump 10, respectively 11.

It is necessary to measure pressure in the brake line 4, therefore above the wing cell pumps 10 and 11, a pressure tension converter 14 is used and which feeds its signals to an electronic evaluating unit 15. Also in each case between the wing cell pump 10, respectively 11, and the allocated wheel brake 6 or 7, respectively, the measured pressure is fed in the same manner to the electronic evaluating unit. Additionally on the wheel brakes 6 and 7 in each case there is a turning rate sensor for the detection of the critical slip states. The individual wing cell pumps 10 and 11 are each controlled over a proportional magnet 16 or 17, respectively, the control signals being generated by the electronic evaluating unit 15. The corresponding electric feed lines are not represented.

Figure 2:
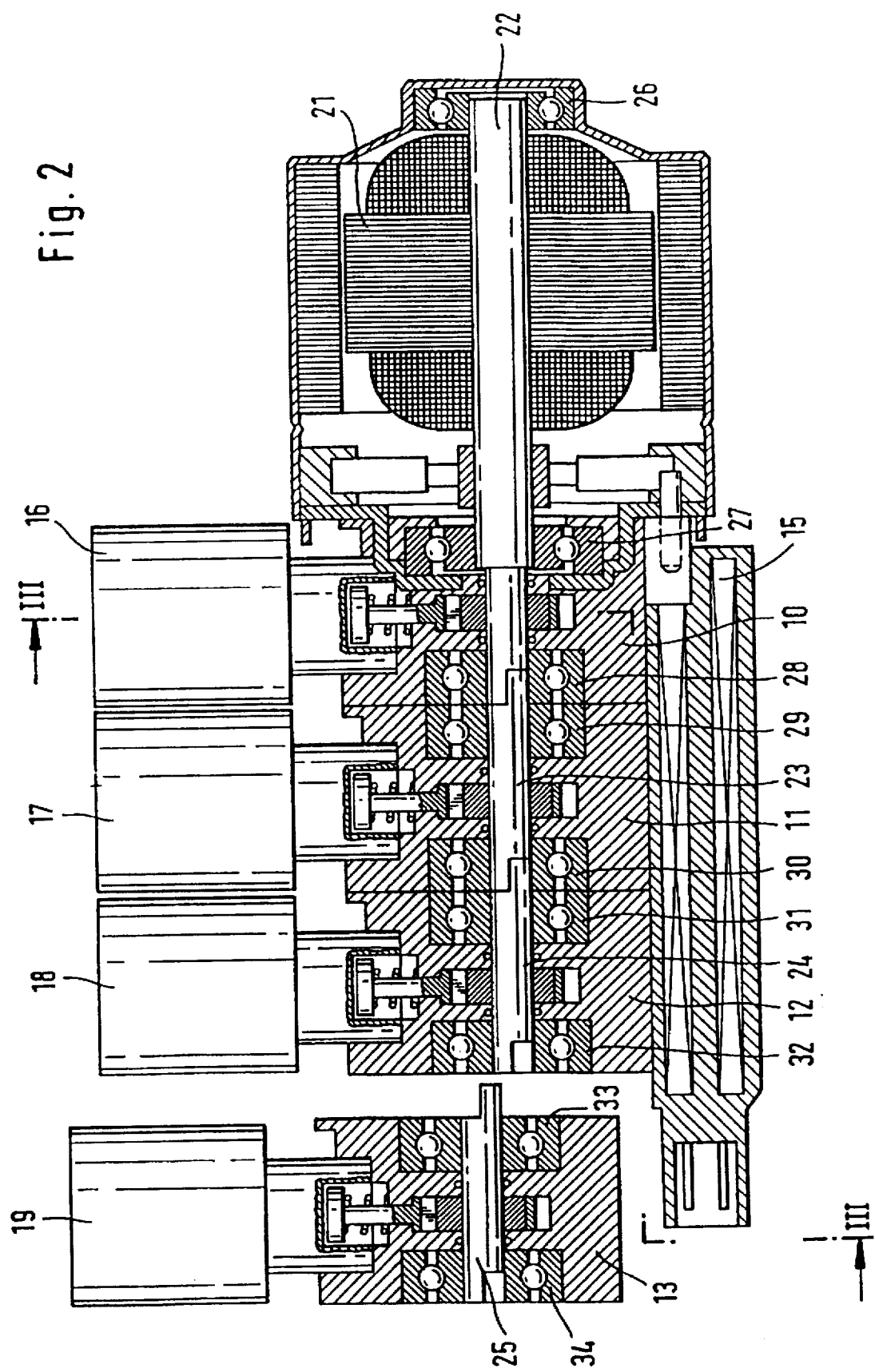
FIG. 2 is a pump arrangement for a brake installation according to the invention.
Figure 3:
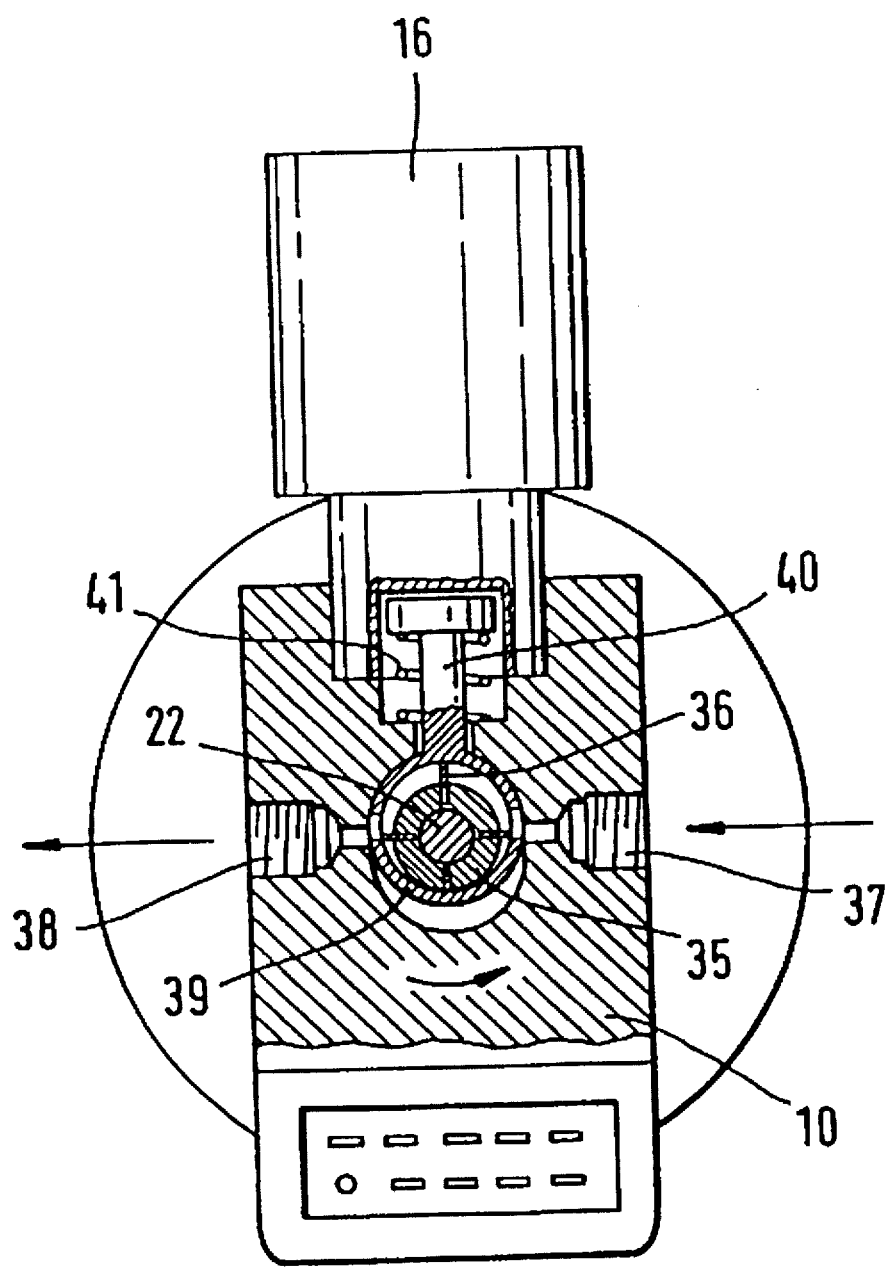
FIG. 3 is an individual wing-cell pump of the arrangement according to FIG. 2.

The exact construction of the individual pumps appears from FIGS. 2 and 3.

In FIG. 2 the motor shaft 22 of the electric motor 21 is made in one piece with the shaft of the first wing cell pump 10. The shafts of the second wing cell pump 11 and each further wing cell pump 12 and possibly 13 are constructed as shaft pieces 23, 24 and 25. They are identically constructed in each case and connectable over a plug-in connection with the motor shaft 22. Their length is in each case so dimensioned that a shaft of the outer pump which is driven by the electric motor 21, ends flush with the pump housing.

Because the first wing cell pump 10 is directly flanged on the electric motor 21, between electric motor 21 and this wing cell pump 10 there is provided only one ball bearing 27 for the motor shaft 22. At the other end of the electric motor 21 and of the pump 10 there is arranged in each case a further ball bearing 26 or 28, respectively. All the further pumps 11, 12 and 13 are constructed identically and have on both ends in each case a ball bearing, 29, 31, 33 and 30, 32, 34, respectively. In the event that the entire shaft is constructed in one piece and the pumps are located in a common pump block, only one bearing is required in each case between the individual pumps.

In FIG. 3 there is represented a wing cell pump 10 in section. The internal construction of the other wing cell pumps 11, 12 and 13 is identical. On the central shaft, which is here formed by the motor shaft 22, there is fastened the rotor 35, which carries elastically the wing 36 pre-tensioned outward. Diametrically oppositely lying are two pressure medium connections 37 and 38. The rotor 35 is surround by a cylindrical lift ring 39, which is allowed to move in a cylindrical cavity of oval cross section perpendicularly to the connecting axis of the pressure medium connections 37 and 38. To make this adjustment possible, the lift ring 39 is connected with a magnet armature 40 which is pre-tensioned over a pressure spring 41, so that the lift ring 39 occupies a rest position at the border of the oval cavity. In the illustration the magnet armature is pre-tensioned toward the proportional magnet 16. On energization of the proportional magnet 16, the magnet armature 40 is forced out of the magnetic field, so that the lift ring 39 is moved out of its rest position. In this manner first of all the conveying performance of the pump is reduced until the lift ring lies concentric with the rotor 35. On further displacement of the magnet armature 40 from the proportional magnet 16 the conveying direction of the pump is reversed, in which case the conveying performance again depends on the eccentricity of the lift ring. In the represented rest position of the lift ring 39 at the upper end of the oval cavity and with the represented counterclockwise direction of the rotor, there is yielded a conveying direction from right to left. In a brake installation according to FIG. 1 it is to be heeded that the pressure medium connection 37 here represented to the right is connected to the main cylinder 1 and the pressure medium connection 38 here represented to the left is connected to a wheel brake, since in the rest position a conveying direction toward the wheel brake is desirable.

Since each individual wing cell pump is individually settable, it is also possible to perform a wheel-individual pressure regulation. The wing cell pumps can be used both for the braking force amplification, for the antilocking regulation, for the drive slip regulation, for the electronic braking force distribution to the rear wheels, as Hill holders, for the automatic braking, for the traveling stability regulation and other conceivable applications of hydraulic brakes. It is merely necessary for the electronic signal processing to be adapted to the particular assignments.

Fundamentally it holds that if the central axis of the lift ring 39 in FIG. 3 lies over the central axis of the shaft 22, a conveyance occurs from right to left, while if the central axis lies underneath the shaft axis a conveyance occurs from left to right. With coaxial arrangement of lift ring and shaft the well cell pump 10 runs in idling. Whether there for the drive of the proportional magnets the signals, from turning rate sensors or from pressure-tension converters, or both are drawn upon, depends on the particular assignments of the brake installation.

We claim:

1. A modular hydraulic motor vehicle brake system comprising:

a first modular pump connected to an associated first wheel brake including,
a first housing,
a first rotor enclosed in said first housing, and
a first shaft member connected to the first rotor;
a second modular pump connected to an associated second wheel brake including,
a second housing,
a second rotor enclosed in said second housing, and
a second shaft member connected to the second rotor; and
an electric motor;
wherein said first pump and said electric motor are connected by said first shaft member and wherein said first and second shaft members are coupled together thereby coupling said first and second pumps.

2. Modular brake system according to claim 1, wherein the electric motor is turning-rate stabilized.

3. Modular brake system according to claim 1, wherein said first and second shaft members includes mating notched portions to facilitate coupling with said first and second pumps.

4. Modular brake system according to claim 1, wherein the first pump is rigidly joined with the electric motor and said first shaft is integral with the motor shaft.

5. Modular brake system according to claim 1, wherein each said pump includes a respectively associated lift ring which is independently adjustable.

6. Modular brake system according to claim 5, wherein each said pump further includes a proportional magnet.

7. Modular brake system according to claim 5, wherein the lift rings are pre-tensioned by elastic means to a position which corresponds to a conveying direction toward the wheel brakes.

* * * * *